(12) United States Patent
Sanibondi et al.

(10) Patent No.: US 11,548,238 B2
(45) Date of Patent: Jan. 10, 2023

(54) METHOD FOR FORMING A TUBE AND A METHOD AND A PACKAGING MACHINE FOR FORMING A PACKAGE

(71) Applicant: Tetra Laval Holdings & Finance S.A., Pully (CH)

(72) Inventors: Paolo Sanibondi, Reggio Emilia (IT); Claudio Ferrari, Albinea (IT); Filippo Ferrarini, Modena (IT); Nicola Macini, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 17/250,839

(22) PCT Filed: Sep. 4, 2019

(86) PCT No.: PCT/EP2019/073595
§ 371 (c)(1),
(2) Date: Mar. 10, 2021

(87) PCT Pub. No.: WO2020/053049
PCT Pub. Date: Mar. 19, 2020

(65) Prior Publication Data
US 2021/0331426 A1 Oct. 28, 2021

(30) Foreign Application Priority Data
Sep. 10, 2018 (EP) .................... 18193454

(51) Int. Cl.
*B29C 65/00* (2006.01)
*B29C 65/10* (2006.01)
(Continued)

(52) U.S. Cl.
CPC .......... *B29C 66/1122* (2013.01); *B29C 65/10* (2013.01); *B29C 65/1432* (2013.01);
(Continued)

(58) Field of Classification Search
CPC ............. B29C 66/1122; B29C 66/4322; B29C 66/72328; B29C 66/849; B29C 65/10;
(Continued)

(56) References Cited

U.S. PATENT DOCUMENTS 2,899,875 A * 8/1959 Leasure .............. B29C 66/8242
493/468
3,408,242 A 10/1968 Rochla
(Continued)

FOREIGN PATENT DOCUMENTS

CH 676958 A5 3/1991
CN 1688483 10/2005
(Continued)

OTHER PUBLICATIONS

International Search Report and Written Opinion of PCT/EP2019/073595, dated Nov. 4, 2019, in 10 pages.
(Continued)

*Primary Examiner* — Daniel McNally
(74) *Attorney, Agent, or Firm* — Knobbe, Martens, Olson & Bear, LLP

(57) ABSTRACT

There is described a method for forming a tube (3) of a web (4, 4) of packaging material comprising the steps of advancing the web (4) of packaging material along a web advancement path (P), overlapping a first lateral edge (19) of the web (4, 4') of packaging material with a second lateral edge (20) of the web (4, 4) of packaging material for obtaining a longitudinal seam portion of the tube (3) and fusing at least an internal outer surface (34) of the first lateral edge (19) and an external outer surface (37) of the second lateral edge (20) with one another for longitudinally sealing the seam portion of the tube (3). The step of fusing comprises at least the substeps of directly heating the external outer surface (37) of the second lateral edge (20) and heating by contact the
(Continued)

internal outer surface (34) by establishing contact between the internal outer surface (34) and the directly heated external outer surface (37).

15 Claims, 4 Drawing Sheets

(51) Int. Cl.
| | |
|---|---|
| *B29C 65/14* | (2006.01) |
| *B29C 65/16* | (2006.01) |
| *B29C 65/50* | (2006.01) |
| *B65B 51/26* | (2006.01) |
| *B29L 31/00* | (2006.01) |

(52) U.S. Cl.
CPC ...... *B29C 65/1632* (2013.01); *B29C 65/5057* (2013.01); *B29C 66/4322* (2013.01); *B29C 66/72328* (2013.01); *B29C 66/849* (2013.01); *B65B 51/26* (2013.01); *B29L 2031/7166* (2013.01)

(58) Field of Classification Search
CPC ............ B29C 65/1432; B29C 65/1632; B29C 65/5057; B65B 51/26
See application file for complete search history.

(56) References Cited

U.S. PATENT DOCUMENTS

| | | | |
|---|---|---|---|
| 3,466,841 A | | 9/1969 | Rausing |
| 3,580,788 A | * | 5/1971 | Gustafson ............... B29C 53/48 156/497 |
| 3,721,534 A | | 3/1973 | Kubick |
| 3,808,074 A | | 4/1974 | Smith et al. |
| 3,854,874 A | | 12/1974 | Loliger et al. |
| 3,864,186 A | | 2/1975 | Balla |
| 3,884,746 A | | 5/1975 | Loliger et al. |
| 3,890,125 A | | 6/1975 | Schoeck |
| 4,169,004 A | | 9/1979 | Kock et al. |
| 4,506,125 A | | 3/1985 | Smets |
| 4,704,509 A | | 11/1987 | Hilmersson |
| 4,721,242 A | * | 1/1988 | Reil ........................ B31F 5/085 229/198.2 |
| 4,757,175 A | | 7/1988 | Mohr et al. |
| 4,776,980 A | | 10/1988 | Ruffini |
| 4,784,697 A | | 11/1988 | Bordini |
| 4,808,326 A | | 2/1989 | Tanino et al. |
| 4,809,485 A | | 3/1989 | Nielsen |
| 5,044,140 A | | 9/1991 | Iwano |
| 5,200,587 A | | 4/1993 | Fang |
| 5,250,140 A | | 10/1993 | Hayashi et al. |
| 5,260,535 A | | 11/1993 | Holmström et al. |
| 5,286,941 A | | 2/1994 | Bel |
| 5,418,069 A | | 5/1995 | Learman |
| 5,418,811 A | | 5/1995 | Ruffini et al. |
| 5,518,578 A | | 5/1996 | Persells |
| 5,588,019 A | | 12/1996 | Ruffini et al. |
| 5,649,407 A | | 7/1997 | Blomqvist |
| 5,714,033 A | | 2/1998 | Hayashi et al. |
| 5,889,263 A | | 3/1999 | Andersson |
| 5,968,399 A | | 10/1999 | Selberg |
| 6,012,267 A | | 1/2000 | Katsumata |
| 6,167,681 B1 | | 1/2001 | Yano et al. |
| 6,216,420 B1 | | 4/2001 | Mazetto |
| 6,430,899 B1 | | 8/2002 | Cicha |
| 6,503,963 B2 | | 1/2003 | Toyoda et al. |
| 6,588,174 B2 | | 7/2003 | Yamamoto |
| 6,837,025 B2 | | 1/2005 | Kume et al. |
| 7,002,117 B2 | | 2/2006 | Thomasset |
| 7,003,934 B1 | | 2/2006 | Yano |
| 7,827,768 B2 | | 11/2010 | Rosberg et al. |
| 8,572,936 B2 | | 11/2013 | Mancin et al. |
| 8,707,661 B2 | | 4/2014 | Kiinoshita et al. |
| 8,707,662 B2 | | 4/2014 | Borsari et al. |
| 8,839,597 B2 | | 9/2014 | Babini et al. |
| 8,938,938 B2 | | 1/2015 | Konno et al. |
| 8,943,786 B2 | | 2/2015 | Konno et al. |
| 9,238,515 B2 | | 1/2016 | Persson et al. |
| 9,352,869 B2 | | 5/2016 | Babini et al. |
| 9,545,751 B2 | | 1/2017 | Hull |
| 9,637,260 B2 | | 5/2017 | Ghirardello et al. |
| 10,160,162 B2 | | 12/2018 | Bierlein et al. |
| 10,350,829 B2 | | 7/2019 | Sandberg et al. |
| 10,350,832 B2 | | 7/2019 | Karlsson et al. |
| 10,358,243 B2 | | 7/2019 | Israelsson et al. |
| 10,414,098 B2 | | 9/2019 | Aurand et al. |
| 10,486,839 B2 | | 11/2019 | Kogure et al. |
| 10,773,846 B2 | | 9/2020 | Gentili et al. |
| 10,875,675 B2 | | 12/2020 | Benedetti et al. |
| 10,919,238 B2 | | 2/2021 | Lancelotti et al. |
| 10,994,495 B2 | | 5/2021 | Israelsson et al. |
| 2001/0047641 A1 | | 12/2001 | Kume et al. |
| 2002/0047009 A1 | | 4/2002 | Flugstad et al. |
| 2002/0108705 A1 | | 8/2002 | Kume et al. |
| 2003/0116886 A1 | | 6/2003 | Nakazawa |
| 2003/0230941 A1 | | 12/2003 | Jacobs |
| 2004/0045635 A1 | | 3/2004 | Bandyopadhyay et al. |
| 2004/0060928 A1 | | 4/2004 | Balla |
| 2004/0182046 A1 | | 9/2004 | Babini et al. |
| 2005/0076612 A1 | | 4/2005 | Andersson et al. |
| 2005/0241277 A1 | | 11/2005 | Yano et al. |
| 2006/0124626 A1 | | 6/2006 | Kupfer et al. |
| 2006/0154052 A1 | | 7/2006 | Waffenschmidt et al. |
| 2007/0251196 A1 | | 11/2007 | Shokri et al. |
| 2009/0101286 A1 | | 4/2009 | Sumeer et al. |
| 2009/0223173 A1 | | 9/2009 | Rapparini |
| 2010/0025391 A1 | | 2/2010 | Palombini et al. |
| 2010/0155390 A1 | | 6/2010 | Hirota |
| 2010/0180545 A1 | | 7/2010 | Palmquist et al. |
| 2010/0243155 A1 | | 9/2010 | Andrews |
| 2011/0030315 A1 | | 2/2011 | Mancin |
| 2011/0094672 A1 | | 4/2011 | Wijk et al. |
| 2011/0225929 A1 | | 9/2011 | Donati et al. |
| 2013/0119044 A1 | | 5/2013 | Gynnild |
| 2013/0063556 A1 | | 10/2013 | Babini et al. |
| 2015/0266603 A1 | | 9/2015 | Aul et al. |
| 2016/0221250 A1 | | 8/2016 | Alexandersson et al. |
| 2016/0229118 A1 | | 8/2016 | Palmquist et al. |
| 2016/0297121 A1 | | 10/2016 | Palmquist et al. |
| 2017/0182702 A1 | | 6/2017 | Mach et al. |
| 2017/0240309 A1 | | 8/2017 | Runini et al. |
| 2018/0243996 A1 | | 8/2018 | Bates et al. |
| 2018/0250888 A1 | | 9/2018 | Mach |
| 2018/0272620 A1 | | 9/2018 | Persson |
| 2019/0152161 A1 | | 5/2019 | Palmquist et al. |
| 2020/0101678 A1 | | 4/2020 | Keikhaee et al. |
| 2020/0148406 A1 | | 5/2020 | Svard et al. |
| 2021/0245902 A1 | | 8/2021 | Donati |
| 2022/0048657 A1 | | 2/2022 | Sanibondi et al. |
| 2022/0127031 A1 | | 4/2022 | Karlsson et al. |

FOREIGN PATENT DOCUMENTS

| | | |
|---|---|---|
| CN | 102181156 | 9/2011 |
| CN | 103501982 | 1/2014 |
| CN | 105073368 | 11/2015 |
| CN | 107406160 | 11/2017 |
| DE | 19815439 | 10/1999 |
| DE | 102015102860 | 9/2016 |
| EP | 0147833 | 7/1985 |
| EP | 0212490 | 3/1987 |
| EP | 0223517 | 5/1987 |
| EP | 0225392 | 6/1987 |
| EP | 0466271 | 1/1992 |
| EP | 0484998 | 5/1992 |
| EP | 0495699 | 7/1992 |
| EP | 0653899 | 5/1995 |
| EP | 0730946 | 9/1996 |
| EP | 0796718 | 9/1997 |
| EP | 0819607 | 1/1998 |
| EP | 0950608 | 10/1999 |
| EP | 1066951 | 1/2001 |

(56) References Cited

FOREIGN PATENT DOCUMENTS

| | | |
|---|---|---|
| EP | 1107358 | 6/2001 |
| EP | 1125844 | 8/2001 |
| EP | 0706945 | 10/2001 |
| EP | 1231149 | 8/2002 |
| EP | 1234771 | 8/2002 |
| EP | 1241098 | 9/2002 |
| EP | 1270182 | 1/2003 |
| EP | 1300340 | 4/2003 |
| EP | 1334911 | 8/2003 |
| EP | 1535843 | 6/2005 |
| EP | 1541641 | 6/2005 |
| EP | 3053834 | 8/2005 |
| EP | 1413520 | 8/2006 |
| EP | 1790572 | 5/2007 |
| EP | 2008795 | 12/2008 |
| EP | 2026630 | 2/2009 |
| EP | 2236270 | 10/2010 |
| EP | 2343242 | 7/2011 |
| EP | 2468480 | 6/2012 |
| EP | 2695816 | 2/2014 |
| EP | 2781325 | 9/2014 |
| EP | 3000584 | 3/2016 |
| EP | 3241667 | 11/2017 |
| EP | 3254979 | 12/2017 |
| FR | 1433873 | 4/1966 |
| FR | 2073137 | 9/1971 |
| FR | 2776616 | 10/1999 |
| GB | 789981 | 1/1958 |
| GB | 789981 | 7/2011 |
| JP | S57148619 | 9/1982 |
| JP | S 63-23900 B | 5/1988 |
| JP | S63-187591 | 8/1988 |
| JP | S63-258729 | 10/1988 |
| JP | H04-6025 | 1/1992 |
| JP | H 04-72141 A | 3/1992 |
| JP | H04-154564 | 5/1992 |
| JP | H08-244728 | 9/1996 |
| JP | H09-077006 | 3/1997 |
| JP | H10-321361 | 12/1998 |
| JP | H11-43115 | 2/1999 |
| JP | H11-514319 | 12/1999 |
| JP | 2000-127198 | 5/2000 |
| JP | 2002-046703 A | 2/2002 |
| JP | 2004-228043 | 8/2004 |
| JP | 2009012354 | 1/2009 |
| JP | 2009-149365 | 7/2009 |
| JP | 2015-16894 | 1/2015 |
| RU | 2096280 C1 | 11/1997 |
| SE | 434240 | 7/1984 |
| SU | 1551588 A1 | 3/1990 |
| SU | 1413026 A1 | 7/1998 |
| WO | WO 1992/015182 | 9/1992 |
| WO | WO 1997/14547 | 4/1997 |
| WO | WO 1999/029574 | 6/1999 |
| WO | WO 2001/085827 | 11/2001 |
| WO | WO 2003/053626 | 7/2003 |
| WO | WO 2003/097332 | 11/2003 |
| WO | WO 2005/004560 | 1/2005 |
| WO | WO 2005/105579 | 11/2005 |
| WO | WO 2005/110855 | 11/2005 |
| WO | WO 2007/008131 | 1/2007 |
| WO | WO 2009/139129 | 11/2009 |
| WO | WO 2010/136756 | 12/2010 |
| WO | WO 2011/075055 | 6/2011 |
| WO | WO 2012/019925 | 2/2012 |
| WO | WO 2013/045254 | 4/2013 |
| WO | WO 2014/072477 | 5/2014 |
| WO | WO 2014/166765 | 10/2014 |
| WO | WO 2015/036222 | 3/2015 |
| WO | WO 2015/040173 | 3/2015 |
| WO | WO 2015/158502 | 10/2015 |
| WO | WO 2016/052689 | 4/2016 |
| WO | WO 2016/083212 | 6/2016 |
| WO | WO 2016/132986 | 8/2016 |
| WO | WO 2017/089186 | 6/2017 |
| WO | WO 2017/089187 | 6/2017 |

OTHER PUBLICATIONS

International Search Report and Written Opinion of PCT/EP2019/073597, dated Nov. 27, 2019, in 9 pages.

Davis, J.R, "Practical Design Guidelines for Surface Engineering" Chapter 8, Surface Engineering for Corrosion and l/Vear Resistance, ASM International, Mar. 2001; eISBN: 9781615030729, pISBN: 9780871707000; pp. 195-229.

Leschynsky et al. "Layered Alloys for Effective Magnetic Flux Concentration in Induction Heating," Materials Science-Poland, vol. 25, No. 2, 2007.

* cited by examiner

METHOD FOR FORMING A TUBE AND A METHOD AND A PACKAGING MACHINE FOR FORMING A PACKAGE

TECHNICAL FIELD

The present invention relates to a method for forming a tube from a web of packaging material, in particular a web of packaging material for the formation of packages of a pourable product.

Furthermore, the present invention relates to a method for forming packages of a pourable product, in particular a pourable food product.

Furthermore, the present invention relates to a packaging machine for forming sealed packages filled with a pourable product.

BACKGROUND ART

As is known, many liquid or pourable food products, such as fruit juice, UHT (ultra-high-temperature treated) milk, wine, tomato sauce, etc., are sold in packages made of sterilized packaging material.

A typical example is the parallelepiped-shaped package for liquid or pourable food products known as Tetra Brik Aseptic (registered trademark), which is made by sealing and folding laminated strip packaging material. The packaging material has a multilayer structure comprising a base layer, e.g. of paper, covered on both sides with layers of heat-seal plastic material, e.g. polyethylene. In the case of aseptic packages for long-storage products, such as UHT milk, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Packages of this sort are normally produced on fully automatic packaging machines, which advance a web of packaging material through a sterilization unit of the packaging machine for sterilizing the web of packaging material, e.g. by means of chemical sterilization (e.g. by applying a chemical sterilizing agent, such as a hydrogen peroxide solution) or physical sterilization (e.g. by means of an electron beam). Then, the sterilized web of packaging material is maintained and advanced within an isolation chamber (a closed and sterile environment), and is folded and sealed longitudinally along a seam portion to form a tube, which is further fed along a vertical advancing direction.

In order to complete the forming operations, the tube is continuously filled with a sterilized or sterile-processed pourable food product, and is transversally sealed and subsequently cut along equally spaced transversal cross sections within a package forming unit of the packaging machine during advancement along the vertical advancing direction.

Pillow packages are so obtained within the packaging machine, each pillow package having a longitudinal sealing band and a pair of top and bottom transversal sealing bands.

Furthermore, prior to the folding and the longitudinal sealing of the web of packaging material a sealing strip of heat-seal plastic material is applied onto an initial web of packaging material and sealed onto the initial web of packaging material for obtaining the web of packaging material from which the tube is formed. The web of packaging material is folded such that the sealing strip is in contact with a portion of the inner side of the tube. In other words, once the final package has been obtained the sealing strip is in contact with the pourable product and avoids that lateral portions of the edge of the web of packaging material, which is positioned within an inner space of the tube, get into contact with the pourable product.

More specifically, during the folding of the web of packaging material a first lateral edge and a second lateral edge of the web of packaging material are overlapped, whereby the second lateral edge is arranged within the inner space of the formed tube. In particular, an internal outer surface of the first lateral edge facing the inner space is in contact with an external outer surface of the second lateral edge facing the internal outer surface of the first lateral edge. In order to seal the longitudinal seam portion, the internal outer surface of the first lateral edge and the external outer surface of the second lateral edge are thermally fused to one another. Typically, the necessary thermal energy (heat) is provided by inductively heating e.g. the aluminum layer if present or by directing a stream of hot air onto the first lateral edge.

Even though the known methods of forming the tube and the packages and the known packaging machines work satisfyingly well, a need is felt to further improve the respective methods and packaging machines.

In particular, a need is felt to increase the efficiency in order to allow for energy savings and/or to decrease the critical time during which the newly formed and sealed seam portion may collapse (i.e. open and/or lose integrity) during further advancement of the tube.

DISCLOSURE OF INVENTION

It is an object of the present invention to provide a method for forming a tube for achieving at least one of the above mentioned aims in a straightforward and low-cost manner.

It is a further object of the present invention to provide a method for forming packages of a pourable product for achieving at least one of the above aims in a straightforward and low-cost manner.

It is a further object of the present invention to provide a packaging machine for achieving at least one of the above aims in a straightforward and low-cost manner.

According to the present invention, there is provided a method and a packaging machine according to the independent claims.

Further advantageous embodiments according to the present invention are specified in the dependent claims.

BRIEF DESCRIPTION OF THE DRAWINGS

Two non-limiting embodiments of the present invention will be described by way of example with reference to the accompanying drawings, in which.

BEST MODES FOR CARRYING OUT THE INVENTION

Number 1 indicates as a whole a packaging machine for producing sealed packages 2 of a pourable product, in particular a (sterilized or sterile-processed) pourable food product such as pasteurized milk, fruit juice, wine, tomato sauce, etc., from a tube 3 of a web 4 of packaging material. In particular, in use, tube 3 extends along a longitudinal axis A, preferentially having a vertical orientation.

Figure 2:
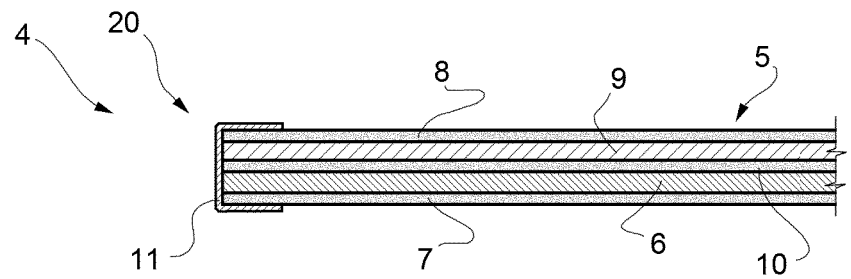
FIG. 2 is a schematic view of a portion of a web of packaging material, with parts removed for clarity.

With particular reference to FIG. 2, web 4 comprises at least an initial web 5 of packaging material having a multi-layer structure.

In more detail, web 4, in particular initial web 5, has at least a layer of fibrous material 6, in particular paper or cardboard, and at least a first layer 7 of heat-seal plastic material and a second layer of heat-seal plastic material. In particular, first layer 7 and second layer 8 interpose layer of fibrous material 6 between one another and define the outer faces of initial web 5.

Preferentially but not necessarily, the heat-seal plastic material is polyethylene.

In the non-limiting example embodiment of FIG. 2, web 4, in particular initial web 5, also comprises a layer of gas- and light-barrier material 9, e.g. an aluminum foil or an ethylene vinyl alcohol (EVOH) film, interposed between layer of fibrous material 6 and first layer 7.

In a preferred non-limiting embodiment, web 4, in particular initial web 5, also comprises a third layer 10 of heat-seal plastic material, in particular of polyethylene, preferably third layer 10 being interposed between layer of fibrous material 6 and layer of gas—and light-barrier material 9.

In a preferred non-limiting embodiment, second layer 8 forms an inner face of tube 3 and/or package 2 eventually contacting the filled in pourable food product. In other words, second layer 8 defines an internal surface of web 4 and/or initial web 5 and, in particular first layer 7 defines an outer surface of web 4, opposite to the internal surface. In use, the internal surface gets into and/or is in contact with the pourable product during filling of tube 3.

In a preferred non-limiting embodiment, web 4 also comprises a sealing strip 11 of heat-seal plastic material applied and/or fused onto initial web 5. In particular, at least a portion of sealing strip 11 is applied to and/or fused onto at least a portion of the internal surface of initial web 5, even more particular onto a portion of second layer 8, preferentially in the area of one edge of initial web 5 (in particular the edge of initial web 5 which will, after formation of tube 3 (and/or packages 2) be arranged within tube 3 (and/or packages 2).

In particular, web 4 comprises sealing strip 11 so as to avoid that the packaging material may absorb the pourable product during or after the filling process.

Furthermore, sealing strip 11 provides for an improved strength and improved gas barrier properties of the seam portion.

Figure 3:
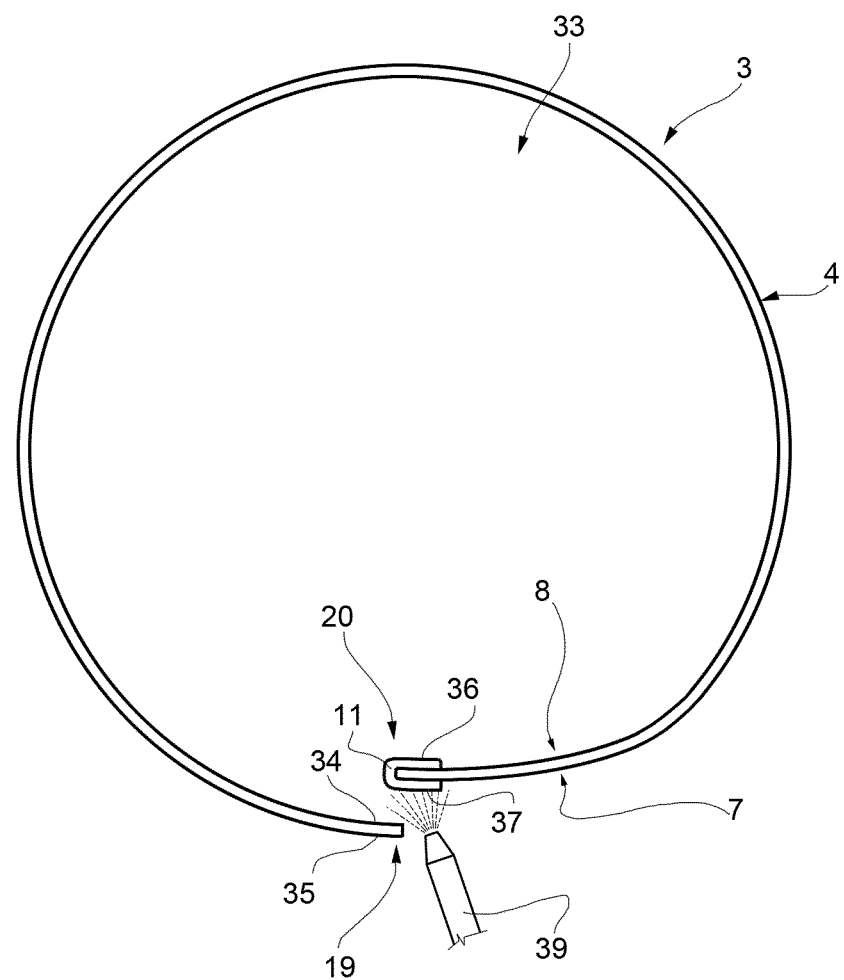
FIG. 3 schematically illustrates a step during the formation of a tube according to a first embodiment, with parts removed for clarity.
Figure 4:
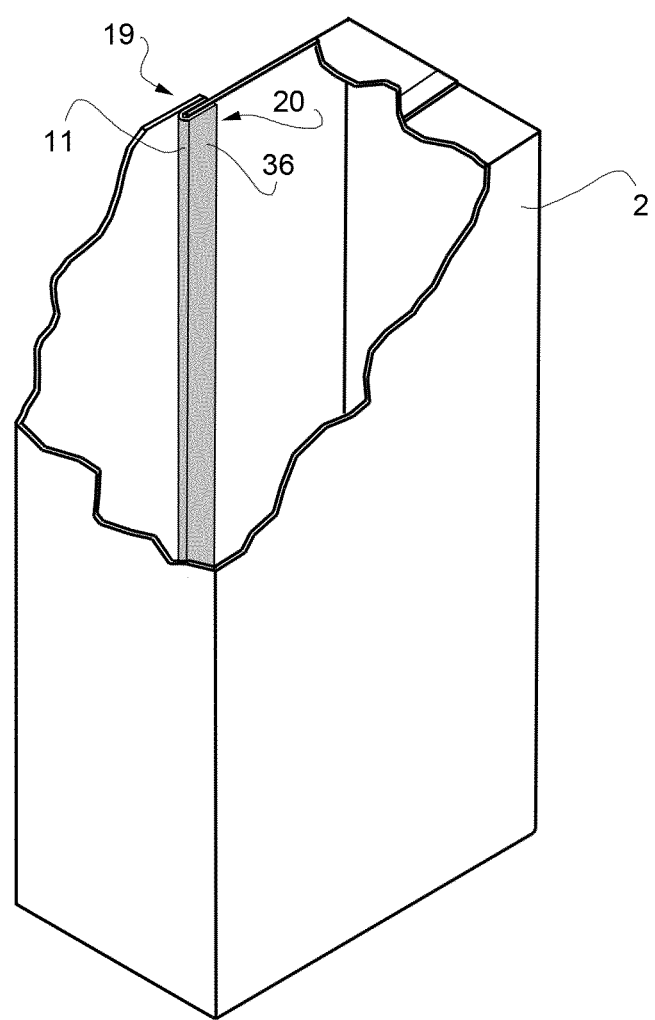
FIG. 4 schematically illustrates an example package according to a first embodiment, with parts removed for clarity.

According to the embodiment shown in FIGS. 2 to 4, at least another portion of sealing strip 11 is applied to and/or fused onto at least a portion of the outer surface, in particular first layer 7, preferentially in the area of one edge of initial web 5.

Preferably but not necessarily, sealing strip 11 applied to initial web 5 presents a C-shaped cross-sectional profile with respect to a cross-sectional plane being transversal, in particular orthogonal, to a longitudinal axis of web 4 and/or with respect to a cross-sectional plane being transversal, in particular orthogonal to longitudinal axis A.

A typical package 2 obtained by packaging machine 1 comprises a longitudinal seal portion and a pair of transversal sealing bands, in particular a transversal top sealing band and a transversal bottom sealing band.

Figure 1:
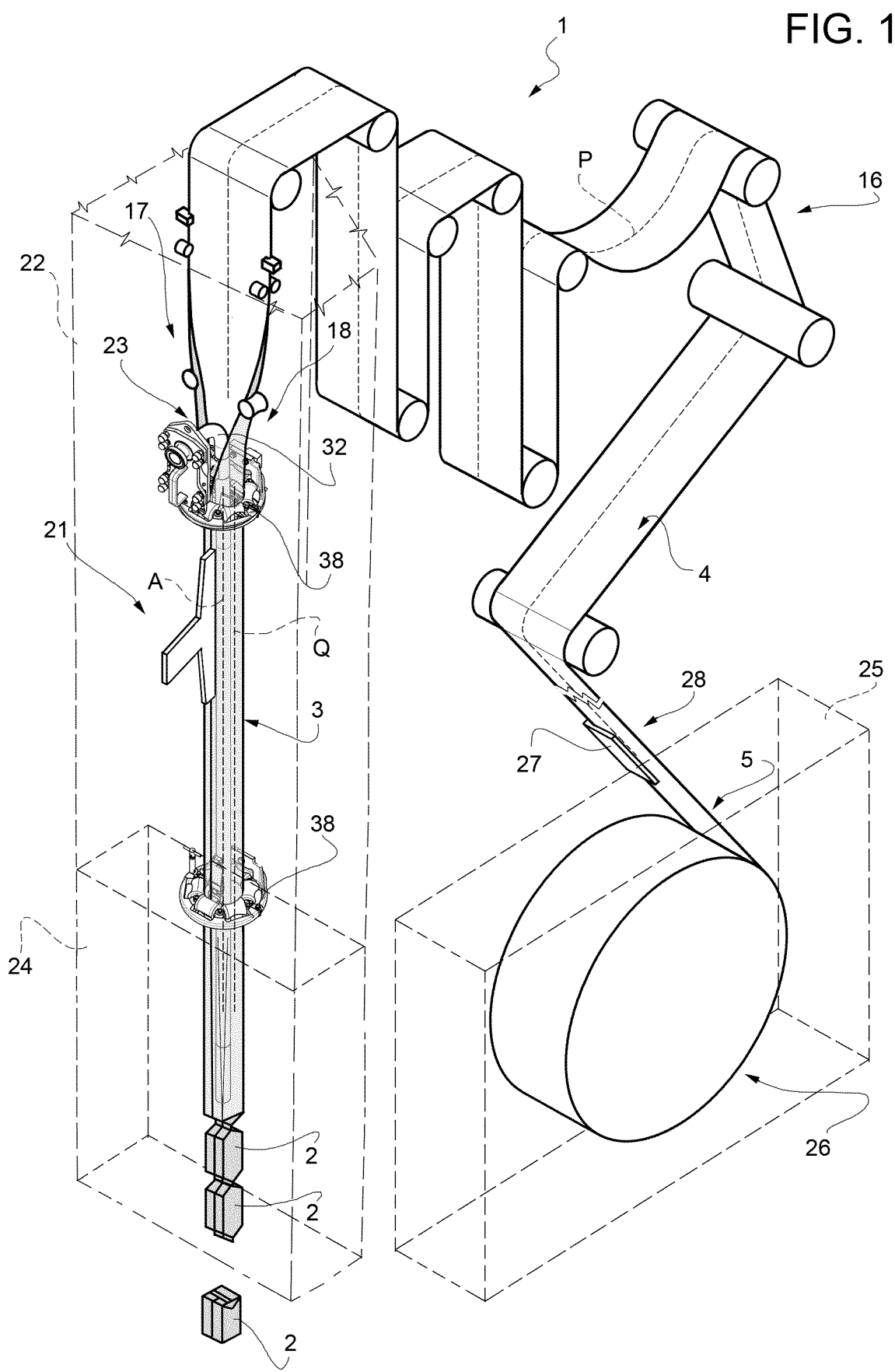
FIG. 1 is a schematic view of a packaging machine according to the present invention, with parts removed for clarity.

With particular reference to FIG. 1, packaging machine 1 comprises:

a conveying device 16 configured to advance web 4 along a web advancement path P at least to a tube forming station 17 at which web 4 is formed, in use, into tube 3 and for advancing tube 3 along a tube advancement path Q;

a tube forming device 18 configured to form tube at tube forming station 17 by overlapping a first lateral edge 19 of web 4 and a second lateral edge 20 of web 4, in particular being opposite to first lateral edge 19, for obtaining a longitudinal seam portion of tube 3; and a sealing device 21 configured to longitudinally seal tube 3 along the longitudinal seam portion.

In a preferred non-limiting embodiment, packaging machine 1 also comprises an isolation chamber 22 extending along a respective longitudinal axis, in particular being parallel to axis A, even more particular having a vertical orientation, and delimiting an inner (aseptic) environment from an outer environment. Preferentially, isolation chamber 22 houses at least some portions of tube forming device 18 and sealing device 21 so that, in use, the formation and the longitudinal sealing of tube 3 occurs within isolation chamber 22 (i.e. within the isolated inner environment).

In a preferred non-limiting embodiment, packaging machine 1 also comprises:

a sterilization apparatus (not shown) for sterilizing at least a portion of web 4 at a sterilization station arranged upstream of tube forming station 17 along web advancement path P, in particular by a chemical sterilization (hydrogen peroxide) and/or physical sterilization (electron beam irradiation);

a filling device 23 for filling tube 3 with the pourable product; and a package forming unit 24 configured to at least form and transversally seal tube 3, preferentially to also transversally cut tube 3, for obtaining packages 2, in particular during advancement of tube 3 along tube advancement path Q.

In a preferred non-limiting embodiment, packaging machine 1 also comprises a magazine unit 25 configured to host initial web 5 and/or web 4 at a host station 26.

In the specific example embodiment shown in FIG. 1, magazine unit 25 is configured to host a reel of initial web 5 at host station 26.

In the specific example embodiment shown, packaging machine 1 also comprises a strip application unit 27 configured to apply sealing strip 11 onto initial web 5 at an application station 28. According to this non-limiting embodiment, conveying device 16 is configured to advance initial web 5 from host station 26 to application station 28 and web 4 from application station 28 to tube forming station 17. In this non-limiting embodiment, sealing strip 11 is applied onto initial web 5 during operation of packaging machine 1.

In an alternative non-limiting embodiment not shown, magazine unit 25 could be configured to host a reel of web 4 and conveying device 16 is configured to advance web 4 from host station 26 to tube forming station 17. In other words, sealing strip 11 is applied to initial web 5 prior to operation of packaging machine 1, e.g. at a web production plant.

In further detail, the sterilization apparatus is arranged upstream of isolation chamber 22 along path P so that, in use, web 4 is sterilized prior to web 4 being formed into tube 3.

Preferentially, the sterilization apparatus is arranged downstream of magazine unit 25 and/or strip application unit 27 along path P.

In particular, package forming unit 24 is arranged downstream of isolation chamber 22, tube forming device 18 and sealing device 21 along path Q.

In more detail, conveying device 16 is configured to advance tube 3 and any intermediate of tube 3 in a manner known as such along path Q, in particular from tube forming station 17 through at least a portion of isolation chamber 22, in particular towards and at least partially through package forming unit 24.

In particular, with intermediates of tube 3 any configuration of web 4 is meant prior to obtaining the tube structure and after folding of web 4 by tube forming device 18 has started. In other words, the intermediates of tube 3 are a result of the gradual folding of web 4 so as to obtain tube 3, in particular by overlapping the opposite first lateral edge 19 and second lateral edge 20 with one another.

With particular reference to FIG. 1, filling device 23 comprises at least a filling tube 32 being in fluid connection with a pourable product storage tank (not shown and known as such) and partially extending within isolation chamber 22. In particular, in use, filling tube 32 is at least partially placed within tube for feeding the pourable product into the, in use, advancing tube 3.

With particular reference to FIGS. 1 and 3, tube has an inner space 33 delimited by web 4. In particular, inner space 33 is, in use, at least partially or becomes at least partially filled with the pourable product.

Preferentially but not necessarily, second lateral edge 20 is arranged within inner space 33 after formation of tube 3 (i.e. second lateral edge 20 is arranged at and/or defines an inner portion of tube 3 after formation of tube 3). In other words, second lateral edge 20 comes into contact with the pourable product after formation and filling of tube 3. In particular, first lateral edge 19 is arranged outside inner space 33 (i.e. first lateral edge 19 is arranged at and/or defines an outer portion of tube 3).

In a preferred non-limiting embodiment, second lateral edge 20 comprises sealing strip 11. In other words, second lateral edge 20 comprises the edge of initial web 5 to which sealing strip 11 is applied and/or fused and sealing strip 11. Thus, in use, sealing strip 11 avoids that the lateral border of second lateral edge 20 gets into contact with the pourable product.

More specifically, first lateral edge 19 comprises a respective internal outer surface 34 facing inner space 33 and a respective external outer surface 35 opposite (and parallel) to internal outer surface 34. Preferentially, internal outer surface 34 and external outer surface 35 are defined by respective portions of respectively second layer 8 and first layer 7 in the proximity of first lateral edge 19.

More specifically, second lateral edge 20 comprises a respective internal outer surface 36 facing inner space 33 and a respective external outer surface 37 opposite (and parallel) to internal outer surface 36. Preferentially but not necessarily, internal outer surface 36 is defined by at least a portion of sealing strip 11 (this latter portion being applied and/or fused to a portion of the internal surface of web 4); and, in particular external outer surface 37 is defined by at least another portion of sealing strip 11 (this latter another portion being applied and/or fused to a portion of the outer surface of web 4).

In particular, external outer surface 37 faces internal outer surface 34. According to the more detailed description further below, during the formation and longitudinal sealing of tube 3 external outer surface 37 and internal outer surface 34 become contacted and fused to one another.

It should be mentioned that within the context of the present invention, the term "internal" refers to these surfaces, which face inner space 33 and the term "external" refers to these surfaces, which face away from inner space 33.

With particular reference to FIG. 1, tube forming device 18 comprises at least a plurality of forming ring assemblies 38, in the particular example shown two, being adapted to fold web 4 gradually into tube 3 by gradually overlapping first lateral edge 19 and second lateral edge 20 with one another. In particular, forming ring assemblies 38 are arranged within parallel and spaced apart planes, in particular being orthogonal to axis A, even more specifically having a substantially horizontal orientation. In particular, forming ring assemblies 38 are arranged within isolation chamber 22.

With particular reference to FIGS. 1 and 3, sealing device 21 is configured to longitudinal seal the seam portion by fusing internal outer surface 34 and the external outer surface 37 with one another.

In more detail, sealing device 21 comprises a heating unit 39 configured to (solely) directly heat the external outer surface 37, in particular without heating internal surface 34. In other words, heating unit 39 is configured such that, in use, internal outer surface 34 is (solely) heated through establishing contact between internal outer surface 34 and the directly heated external outer surface 37 and the transfer of thermal energy (heat) from external outer surface 37 to internal outer surface 34.

In other words, in use, prior to establishing contact between external outer surface 37 and internal outer surface 34, the temperature of internal outer surface 34 is lower than the temperature of external outer surface 37.

In a preferred non-limiting embodiment, in use, prior to establishing contact between external outer surface 37 and internal outer surface 34, the temperature of internal outer surface 34 is substantially identical to the ambient temperature (i.e. the temperature within the inner environment of isolation chamber 22).

This is advantageous as the time needed for the cooling down of the seam portion is reduced as the heat is transferred from external outer surface 37 to internal outer surface 34. Furthermore, another advantage resides in a reduced overall needed energy consumption.

Preferentially but not necessarily, heating unit 39 is arranged within isolation chamber 22.

In a preferred non-limiting embodiment, heating unit 39 is configured to direct a stream of hot gas, in particular hot (sterile) air, onto external outer surface 37.

Alternatively, heating unit 39 could be configured to heat external outer surface 37 by any heating means, e.g. a ray of laser light, by a plasma and/or by electron-beam irradiation.

In particular, heating unit 39 is configured to heat external outer surface 37 to a temperature allowing to change the physical state of external outer surface and, in particular to allow the fusion of internal outer surface 34 and external outer surface 37 with one another.

In a preferred non-limiting embodiment, sealing device 21 also comprises a pressing assembly configured to exert a mechanical force onto the seam portion for promoting the longitudinal sealing. Preferably but not necessarily, at least a portion of the pressing assembly is arranged on the forming ring assembly 38 arranged downstream of the other one along path Q.

In a preferred non-limiting embodiment, package forming unit 24 comprises a plurality of complementary pairs of operative units (not shown and known as such) configured to at least shape and transversally seal, in particular also to transversally cut, tube 3 for defining and/or obtaining packages 2.

In use, packaging machine 1 forms packages 2 filled with the pourable product.

In more detail, operation of packaging machine 1 comprises at least the following steps:
- advancing web 4 along advancement path P;
- overlapping first lateral edge 19 with second lateral edge 20 for obtaining the longitudinal seam portion; and
- fusing at least internal outer surface 34 and external outer surface 37 with one another for longitudinally sealing the seam portion of tube 3.

In a preferred non-limiting embodiment, operation of packaging machine 1 also comprises the step of applying sealing strip 11 to initial web 5 for obtaining web 4 and, preferentially but not necessarily also the step of advancing initial web 5, in particular from host station 26, to application station 28 at which sealing strip 11 is applied and/or fused to initial web 5 during the step of application.

In a preferred non-limiting embodiment, operation of packaging machine 1 also comprises the steps of:
- sterilizing web 4 at the sterilization station, in particular being executed prior to the step of folding and the step of longitudinally sealing;
- filling tube 3 with the pourable product;
- advancing tube 3 along path Q; and
- obtaining single packages 2 from tube 3 by forming tube 3, transversally sealing tube 3 between successive packages 2 and, in particular transversally cutting tube 3 between successive packages 2 for obtaining single packages 2.

In more detail, during the step of advancing web 4, conveying device 16 advances web 4 along path P to tube forming station 17 and, in particular from application station 28 or host station 26.

Preferably but not necessarily, during the step of advancing web 4, conveying device 16 advances web 4 through the sterilization station.

In a preferred non-limiting embodiment, during the step of sterilizing web 4, at least a portion of web 4 is sterilized by chemical sterilization (e.g. by the application of hydrogen peroxide or by advancing through an hydrogen peroxide atmosphere or by advancing through an hydrogen peroxide bath) and/or by physical sterilization (e.g. by the application of a sterilization irradiation such as electromagnetic irradiation (UV light), electron beam irradiation, x-ray irradiation, gamma-ray irradiation, beta-ray irradiation).

In a preferred non-limiting embodiment, during the step of filling tube 3, filling device 23 fills tube 3 with the pourable product, in particular the pourable product flows form the product storage tank through filling tube 32 into tube 3.

In a preferred non-limiting embodiment, during the step of advancing tube 3, tube 3 advances towards and through at least a portion of package forming unit 24.

In more detail, conveying device 16 advances tube 3 through a portion of isolation chamber 22 and into package forming unit 24.

In a preferred non-limiting embodiment, during the step of obtaining single packages 2, the complementary pairs of operative units interact with the advancing tube 3 and shape and transversally seal, in particular also transversally cut, tube 3 for defining and/or obtaining single packages 2.

In more detail, during the step of overlapping, web 4 is gradually folded into tube 3 by drawing closer and finally overlapping first lateral edge 19 and second lateral edge 20 with one another. In particular, the overlapping of first lateral edge 19 and second lateral edge 20 is determined and/or controlled by tube forming device 18, in particular by at least forming ring assemblies 38.

Advantageously, during the step of overlapping, internal outer surface 34 and external outer surface 37 are brought into contact with one another.

In more detail, during the step of overlapping, web 4 advances along path P and interacts with tube forming device 18, in particular with at least forming ring assemblies 38.

Advantageously, the step of fusing, comprises at least the sub-steps of:
- directly heating external outer surface 37; and
- (solely) heating by contact internal outer surface 34 by establishing contact between internal outer surface 34 and the directly heated external outer surface 37.

In particular, internal outer surface 34 is heated by contact with external outer surface 37 due to a transfer of thermal energy (heat) from external outer surface 37 to internal outer surface 34. In particular, in this way, internal outer surface 34 is subjected to a change of its temperature and therewith to a change of the physical state and/or phase of internal outer surface 34 solely upon contact with external outer surface 37. In other words, the thermal energy (heat) for fusing external outer surface 37 and internal outer surface 34 with one another results only from the directly heated external outer surface 37.

Preferentially but not necessarily, prior to the sub-step of heating by contact, the temperature of internal outer surface 34 is lower than the temperature of external outer surface 37.

In a preferred non-limiting embodiment, prior to the sub-step of heating by contact, the temperature of internal outer surface 34 is substantially equal to the ambient temperature (i.e. the temperature within the inner environment of isolation chamber 22).

This is advantageous, as the time needed for cooling down of the seam portion and/or internal outer surface 34 and external outer surface 37 after the step of fusing is reduced with respect to the known approaches. This again results in a reduced critical time during which a collapse of the seam portion (i.e. opening and/or losing integrity during further advancement of tube 3) may occur.

In the preferred non-limiting embodiment disclosed, internal outer surface 34 and external outer surface 37 are of heat-seal plastic material, in particular polyethylene.

In the specific case shown in FIGS. 3 and 4, external outer surface 37 is defined by a portion of sealing strip 11 (in the proximity of second lateral edge 20). Preferentially, internal outer surface 34 is defined by a portion of second layer 8 (in the proximity of first lateral edge 19).

In the specific example of FIGS. 3 and 4, during the sub-step of directly heating, the portion of sealing strip 11 defining external outer surface 37 is directly heated.

In more detail, during the sub-step of directly heating, heating unit 39 directly heats external outer surface 37.

In particular, heating unit 39 directs a flow of a heated gas onto external outer surface 37 or, alternatively heating unit 39 heats external outer surface 37 by a ray of laser light, by a plasma, by electron-beam irradiation or a combination thereof.

Preferentially but not necessarily, operation of packaging machine 1 also comprises a step of pressing, in particular executed after and/or during the step of fusing, during which a mechanical force is exerted on the seam portion, in particular by the pressing assembly, so as to further strengthen the sealed seam portion.

In more detail, during the step of applying, the sealing strip 11 is applied onto initial web 5 at application station 28.

Preferentially but not necessarily, during the step of applying, at least a portion of sealing strip 11 is applied, in particular fused, onto at least the internal surface of initial web 5. In the specific example disclosed in FIGS. 3 and 4, during the step of applying, at least another portion of sealing strip 11 is applied onto the external surface of initial web 5. In particular, in the specific example disclosed, it is this another portion of sealing strip 11, which defines external outer surface 37 and which becomes fused with internal outer surface 34.

In particular, sealing strip 11 is applied to initial web 5 at second lateral edge 20.

Figure 5:
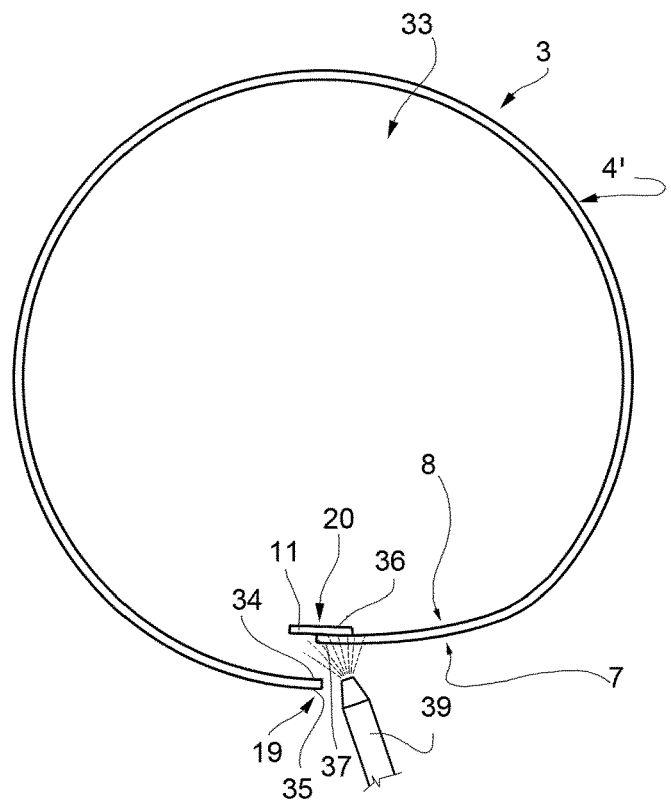
FIG. 5 schematically illustrates a step during the formation of a tube according to a second embodiment, with parts removed for clarity.
Figure 6:
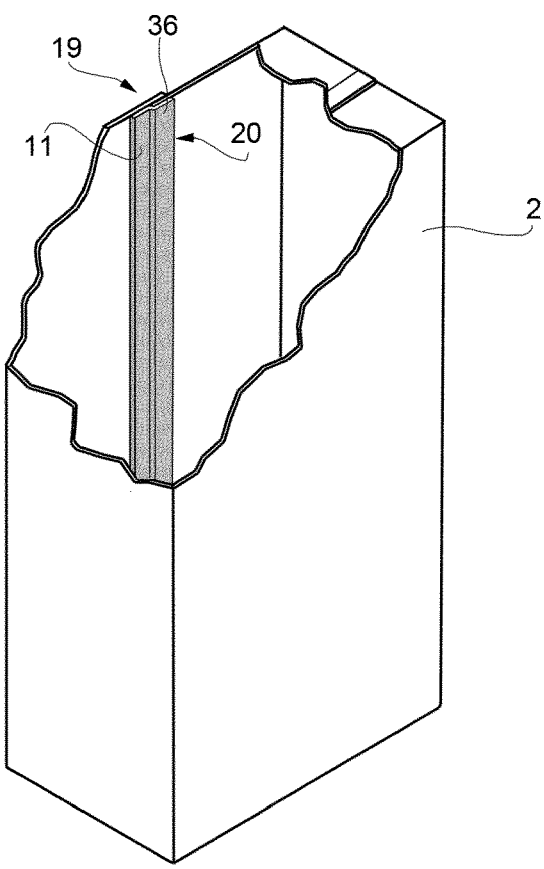
FIG. 6 schematically illustrates an example package according to a second embodiment, with parts removed for clarity.

With reference to FIGS. 5 and 6, number 4' indicates an alternative embodiment of a web of packaging material used and/or useable for the formation of tube 3; as web 4' and its handling by packaging machine 1 is similar to web 4 and its handling by packaging machine 1, the following description is limited to the differences between them, and using the same references, where possible, for identical or corresponding parts.

In particular, web 4' differs from web 4 in how sealing strip 11 is applied and/or fused onto the respective initial web 5. In particular, a portion of sealing strip 11 is applied and/or fused onto the internal surface of initial web 5 (i.e. a portion of second layer 8 in the proximity of second lateral edge 20) and another portion of sealing strip 11 is, at least until the final formation of tube 3, free (it is a free portion; i.e. it is not applied and/or fused to initial web 5). In other words, a portion of sealing strip 11 is applied and/or fused onto initial web 5 and the another portion not being applied and/or fused protrudes away from initial web 5. After formation of tube 3 (and/or packages 2), sealing strip 11 presents a substantially S-like cross-sectional profile with respect to a cross-sectional plane being transversal, in particular orthogonal to longitudinal axis A.

In the specific example shown in FIGS. 5 and 6, external outer surface 37 is defined by the free portion of sealing strip 11 and, preferentially but not necessarily a portion of first layer 7 in the proximity of second lateral edge 20.

In use, during the sub-step of directly heating, the free portion of sealing strip 11 and the portion of first layer 7 in the proximity of second lateral edge 20 is directly heated and, subsequently, fused to internal outer surface 34.

Preferentially but not necessarily, during the step of applying, only a portion of sealing strip 11 is applied and/or fused onto the internal surface of initial web 5.

The advantages of packaging machine 1 and the method for forming tube 3 according to the present invention will be clear from the foregoing description.

In particular, by directly heating only external outer surface 37 and heating internal outer surface 34 through contact with external outer surface 37 it is achieved that the cooling time of seam portion after sealing is reduced with respect to the known methods. This again means that the risk of a collapse of the seam portion after its longitudinal sealing is reduced during further advancement of tube 3.

Another advantage resides in that the overall energy consumption for obtaining the sealed seam portion is reduced as only a limited portion of web 4 is heated.

A further advantage resides in that the overall heating process during the longitudinal sealing of the seam portion is further increased.

An even other advantage is that only surface portions of web 4 are heated. For example, when inductively heating a web of packaging material having e.g. an aluminum layer, the heat diffuses from the inner of web 4 towards and to the outside, leading to a limited control of the overall heating process and heating also portions of web 4 (e.g. second layer 8), which are not necessary for obtaining a good sealing of the seam portion.

Clearly, changes may be made to packaging machine 1 and/or the method as described herein without, however, departing from the scope of protection as defined in the accompanying claims.

In an alternative embodiment not shown, web 4 does not comprise sealing strip 11. In other words, web 4 is substantially identical to initial web 5. In such an alternative embodiment, external outer surface 37 is defined by a portion of first layer 7 in the proximity of second lateral edge 20. Accordingly, in use, the above-mentioned portion of first layer 7 is directly heated for allowing the fusion of external outer surface 37 and internal outer surface 34 to one another.

The invention claimed is:

1. A method for forming a tube of a web of packaging material, comprising:
    advancing the web of packaging material along a web advancement path (P);
    overlapping a first lateral edge of the web of packaging material with a second lateral edge of the web of packaging material for obtaining a longitudinal seam portion of the tube; wherein the so obtained tube has an inner space; wherein the second lateral edge is arranged within the inner space after formation of the tube; wherein the first lateral edge comprises an internal outer surface facing the inner space and the second lateral edge comprises an external outer surface facing the internal outer surface of the first lateral edge, wherein during formation of the tube, the second lateral edge delimits an inner area of a partially formed tube;
    providing a heating device in an operative position, in which the heating device faces the external outer surface of the second lateral edge and is entirely located outside of the inner area of the partially formed tube;
    fusing at least the internal outer surface and the external outer surface with one another for longitudinally sealing the seam portion of the tube; and
    wherein fusing comprises
    directly heating the external outer surface of the second lateral edge through the heating device arranged in the operative position; and
    heating by contact the internal outer surface by establishing contact between the internal outer surface and the directly heated external outer surface.

2. Method according to claim 1, wherein the web of packaging material comprises an initial web of packaging material and a sealing strip applied onto the initial web of packaging material;
    the method further comprising applying the sealing strip onto the initial web of packaging material such that the second lateral edge comprises the sealing strip.

3. Method according to claim 2, wherein at least a portion of the sealing strip defines at least a portion of the external outer surface.

4. Method according to claim 2, wherein the sealing strip is applied, prior to overlapping and sealing.

5. Method according to claim 2, wherein while applying the sealing strip, the sealing strip is applied onto at least an internal surface of the initial web of packaging material, the internal surface of the initial web of packaging material facing the inner space of the tube after formation of the tube.

6. Method according to claim 2, wherein during application of the sealing strip, at least another portion of the sealing strip is applied onto an external surface of the initial web of packaging material, opposite to an internal surface; wherein the external surface of the initial web of packaging material faces the internal outer surface after the formation of the tube.

7. The method according to claim 2, wherein at least a portion of the sealing strip is directly heated during sealing.

8. Method according to claim 1, wherein during sealing, a heating unit directly heats the external outer surface of the second lateral edge.

9. Method according to claim 8, wherein the heating unit directly heats by a flow of a heated gas and/or, by a ray of laser light and/or, by a plasma and/or by electron-beam irradiation.

10. Method according to claim 1, wherein prior to heating by contact, the temperature of the internal outer surface is lower than the temperature of the external outer surface.

11. Method according to claim 1, wherein prior to heating by contact, the temperature of the internal outer surface is substantially equal to the ambient temperature.

12. Method according to claim 1, wherein the web of packaging material comprises a plurality of layers;
wherein the external outer surface and the internal outer surface comprise a heat-seal plastic material.

13. A packaging machine for producing sealed packages of a pourable product from a web of packaging material advancing along a web advancement path, the packaging machine comprising:
a conveying device for advancing the web of packaging material along the web advancement path at least to a tube forming station at which the web (4) of packaging material is formed, in use, into a tube;
a tube forming device configured to form the tube at the tube forming station by overlapping a first lateral edge of the web of packaging material with a second lateral edge of the web of packaging material for obtaining a longitudinal seam portion of the tube; wherein the second lateral edge is arranged within an inner space of the tube after formation of the tube; wherein the first lateral edge comprises an internal outer surface facing the inner space and the second lateral edge comprises an external outer surface facing the internal outer surface, wherein during formation of the tube, the second lateral edge delimits an inner area of a partially formed tube;
a sealing device configured to longitudinal seal the seam portion by fusing the internal outer surface and the external outer surface with one another;
wherein the sealing device comprises a heating device configured to directly heat the external outer surface of the second lateral edge without heating the internal outer surface of the first lateral edge; and
wherein the heating device faces said external outer surface of the second lateral edge and is entirely located outside of the inner area of the partially formed tube.

14. The packaging machine according to claim 13, wherein the heating unit is configured to directly heat the external outer surface by a flow of a heated gas, and/or by a ray of laser light, and/or by a plasma and/or by electron-beam irradiation.

15. A method for forming a tube of a web of packaging material, comprising:
advancing the web of packaging material along a web advancement path, the web of packaging material comprising a sealing strip;
overlapping a first lateral edge of the web of packaging material with a second lateral edge of the web of packaging material to form a tube comprising a longitudinal seam, the tube comprising an inner space;
wherein the second lateral edge is arranged within the inner space after formation of the tube;
wherein the first lateral edge comprises an internal outer surface facing the inner space and the second lateral edge comprises an external outer surface facing the internal outer surface of the first lateral edge and an inner surface facing the inner space after formation of the tube;
wherein the sealing strip comprises a first portion applied to the inner surface of the second lateral edge and a second portion that protrudes away from the second lateral edge, the sealing strip comprising a first face applied to the inner surface of the second lateral edge and a second face opposite to the first face;
fusing at least the internal outer surface and the external outer surface with one another to longitudinally seal the seam portion of the tube;
directly heating the external outer surface of the second lateral edge;
heating by contact the internal outer surface by establishing contact between the internal outer surface and the directly heated external outer surface; and
wherein, during the step of directly heating, the second portion of the sealing strip is directly heated and, subsequently, fused to the internal outer surface on said first face of the sealing strip.

* * * * *